US009460561B1

(12) United States Patent
Côté et al.

(10) Patent No.: US 9,460,561 B1
(45) Date of Patent: Oct. 4, 2016

(54) HYPERMODEL-BASED PANORAMA AUGMENTATION

(71) Applicant: Bentley Systems, Incorporated, Exton, PA (US)

(72) Inventors: Stéphane Côté, Lac Beauport (CA); Rob Snyder, Lexington, KY (US); Phillippe Trudel, Grand-Mere (CA)

(73) Assignee: Bentley Systems, Incorporated, Exton, PA (US)

( * ) Notice: Subject to any disclaimer, the term of this patent is extended or adjusted under 35 U.S.C. 154(b) by 324 days.

(21) Appl. No.: 13/836,776

(22) Filed: Mar. 15, 2013

(51) Int. Cl.
*G06T 19/00* (2011.01)

(52) U.S. Cl.
CPC ................... *G06T 19/006* (2013.01)

(58) Field of Classification Search
None
See application file for complete search history.

(56) References Cited

U.S. PATENT DOCUMENTS

| 5,815,154 | A | 9/1998 | Hirschtick et al. | |
|---|---|---|---|---|
| 8,264,504 | B2 | 9/2012 | Naimark | |
| 2003/0052877 | A1 | 3/2003 | Schwegle, Jr. et al. | |
| 2003/0071810 | A1 | 4/2003 | Shoov et al. | |
| 2008/0024484 | A1* | 1/2008 | Naimark ............... | G06T 7/0028 345/419 |
| 2008/0218331 | A1 | 9/2008 | Baillot | |
| 2009/0213116 | A1 | 8/2009 | Konev et al. | |
| 2011/0166831 | A1* | 7/2011 | Snyder et al. ................... | 703/1 |
| 2011/0301919 | A2 | 12/2011 | Snyder et al. | |
| 2012/0300984 | A1* | 11/2012 | Dann et al. ................... | 382/103 |
| 2012/0314096 | A1 | 12/2012 | Kruglick | |
| 2013/0002649 | A1 | 1/2013 | Wu et al. | |
| 2013/0226529 | A1 | 8/2013 | Santiquet et al. | |

OTHER PUBLICATIONS

Grossman, Tovi, Ravin Balakrishnan, Gordon Kurtenbach, George Fitzmaurice, Azam Khan, and Bill Buxton. "Interaction techniques for 3D modeling on large displays." In Proceedings of the 2001 symposium on Interactive 3D graphics, pp. 17-23. ACM, Mar. 2001.*
Bazargan, Kaveh, et al., "Specifying the Representation of Non-geometric Information in 3D Virtual Environments," Proceedings of the 13th International Conference on Human-Computer Interaction. Part II: Novel Interaction Methods and Techniques, Julie A. Jacko (ed.), Springer-Verlag, Berlin, Heidelberg, 2009, pp. 773-782.
Boujut, Jean-Francois, et al., "Design of a 3D Annotation Tool for Supporting Evaluation Activities in Engineering Design," 2005, pp. 1-9.
Engelson, Vadim, et al., "Mechanical CAD with Multibody Dynamic Analysis Based on Modelica Simulation," Proceedings of the 44th Scandinavian Conference on Simulation and Modeling (SIMS'2003), 2003, pp. 1-6.

(Continued)

*Primary Examiner* — Kee M Tung
*Assistant Examiner* — Yi Wang
(74) *Attorney, Agent, or Firm* — Cesari and McKenna, LLP; James A. Blanchette (57) ABSTRACT

In one embodiment, a two-dimensional (2-D) drawing is shown in an augmented reality view on a display screen of an electronic device. A three-dimensional (3-D) model is imposed within a view of the physical structure captured by a camera. The 2-D drawing is also imposed within the view of the physical structure. A portion of the 2-D drawing whose details correspond to internal features of the physical structure may be shown by sliding the 2-D drawing from a particular position to a different position, or by displaying the 2-D drawing within context of the 3-D model, which is in turn displayed within context of the view of the physical structure.

25 Claims, 8 Drawing Sheets

(56) References Cited

OTHER PUBLICATIONS

Foucault, Gilles, et al., "Enriching Assembly CAD Models with Functional and Mechanical Informations to Ease CAE," Proceedings of the ASME 2010 International Design Engineering Technical Conferences & Computers and Information in Engineering Conference IDETC/CIE 2010, Montreal, Canada, Aug. 15-18, 2010, pp. 1-11.

Gotzelmann, Timo, et al., "Annotation of Animated 3D Objects," 2007, pp. 1-14.

Polys, Nicholas Fearing, "Display Techniques in Information-Rich Virtual Environments," Dissertation Submitted to the Faculty of the Virginia Polytechnic Institute and State University, Blacksburg, Virginia, Jun. 2, 2002, pp. 1-172.

Ritter, Felix, et al., "Illustrative Shadows: Integrating 3D and 2D Information Displays," IUI' 03, ACM, Jan. 12-15, 2003, pp. 166-173.

Stein, Thierry, et al., "Dynamic Label Placement for Improved Interactive Exploration," Proceeding NPAR '08 Proceedings of the 6th international symposium on Non-photorealistic animation and rendering, ACM, 2008, pp. 15-21.

Cote, Stephane et al., "Technique for Providing an Initial Pose for a 3-D Model", U.S. Appl. No. 13/364,846, filed Feb. 2, 2012,35 pages.

\* cited by examiner

HYPERMODEL-BASED PANORAMA AUGMENTATION

BACKGROUND

1. Technical Field

The present disclosure relates to augmented reality, and more specifically, to techniques for displaying a 2-D drawing in a user-understandable manner within an augmented reality view.

2. Background Information

Augmented reality is a technology in which a view of a physical environment is augmented by computer-generated graphics, text or other information, which is overlaid upon the view of the physical environment (i.e. a real-life environment) to appear as if it is part of the scene. The view of the physical environment being augmented may be a static view (e.g., a still image) or a dynamic view (e.g., a full-motion video, live or recorded). In contrast to virtual reality, where a simulated environment is shown to a user rather than a view of a physical environment, augmented reality blends the virtual with the real, to enhance a user's perception of the physical environment. Augmented reality may be used in connection with two-dimensional (2-D) drawings. In order to construct a physical structure (e.g., a building) in the physical environment, a user (e.g., builder) may utilize various types of 2-D drawings, including plans, cross sections, and the like. The 2-D drawings may act as directive statements that indicate essential tasks to be performed. For example, a directive statement may indicate something to be performed, for example conveying one should "look here (at this location), understand this and do this." Further, a directive statement may also validate something, for example convey that "this location (the location of this statement) is validated." The communicative effectiveness of these statements depends on them being understood in relation to the proper locations, and together with other statements. However, given large volumes of 2-D drawings (directive statements), the user may have difficulty relating their locations and understanding them as a whole. The user typically has to look at each of the 2-D drawings and attempt to create a mental model to determine the locations at issue and how the statements interrelate. This can be a daunting task which prevents effective communication. 2-D drawings are often misunderstood, because of their abstraction, causing delay, error, and waste.

To assist the user, attempts have been made to use augmented reality to directly overlay 2-D drawings onto views of physical structures. However, such direct overlay techniques may not effectively convey the information contained by the 2-D drawings. Often there is not a surface available in the view of a physical structure coinciding with what the drawings show. Attempts to overlay the 2-D drawing on some other surface may lead to confusion. In short, the 2-D drawings lack an environment in which they can be appreciated thoroughly, correctly, and easily understood.

Accordingly, there is a need for improved techniques for providing directive statements to a user in a way they can readily assimilate, understand, and act on, and more specifically for displaying 2-D drawings within augmented reality views to a user in an intelligible manner.

SUMMARY

In one embodiment, an augmented reality view is generated in which a 3-D model is used as an environment for displaying 2-D drawings (directive statements) within a view of a physical structure captured by a camera. By interjecting the 3-D model into the view, the 2-D drawings may be presented in a more understandable manner to the user. Further, the 2-D drawing may enhance the view of the physical structure, for example, transforming the visual environment from being non-directive, into a directive environment, that offers an indication of what to look at and do, and/or affirms location-specific validity.

More specifically, the 3-D model may correspond to at least a portion of the physical structure, with elements of the 3-D model corresponding to features of the physical structure. The 3-D model may be imposed within the view of the physical structure such that its elements are co-located with the features of the physical structure. The 3-D model may be used to align a 2-D drawing that is also imposed within the view. The 2-D drawing may be depicted as a planar representation having a particular position and orientation. The 2-D drawing may be positioned and orientated such that details in the 2-D drawing are aligned with corresponding elements of the 3-D model. The 2-D drawing may be clipped where its position and orientation would cause it to be disposed internal to the physical structure.

To permit the user to view portions of the 2-D drawing that would be hidden when the 2-D drawing is aligned with corresponding elements of the 3-D model, one or both of two mechanisms may be employed. First, the 2-D drawing may be slidable in the augmented reality view, such that it can be slid in, or slid out of, the view of the physical structure. In such an implementation, the 3-D model may not be visible and the view of the physical structure may be fully shown (i.e., not cut away). The 2-D drawing may be clipped where it intersects elements of the 3-D model that coincide with the boundaries of the physical structure. The sliding may involve movement in one or more directions along a plane, while orientation is maintained constant. As the 2-D drawing is slide into, or slide out of, the view of the physical structure, the extent to which the 2-D drawing is clipped will change. When fully slid out, the 2-D drawing may be entirely visible, permitting the user to view details that correspond to internal portions of the physical structure.

Second, the 2-D drawing may be shown still aligned with corresponding elements of the 3-D model (i.e., in-situ), using the 3-D model to provide context for the details of the 2-D drawing. In such an implementation, the 3-D model may be visible in the foreground. The model may be cut away once to provide visual access the 2-D drawing. The model may be further cut away to reveal some portion of the view of the physical structure, to provide contextual background. As an end result, the 2-D drawing is shown surrounded by the 3-D model in a selected region, which is in turn shown surrounded by the view of the physical structure. By showing the 2-D drawing within the context of the 3-D model, which is in turn shown within the context of the view of the physical structure, details of the drawing may appear within an understandable setting in the augmented reality view.

BRIEF DESCRIPTION OF THE DRAWINGS

The detailed description below refers to the accompanying drawings of example embodiments, of which.

DETAILED DESCRIPTION

Figure 1:
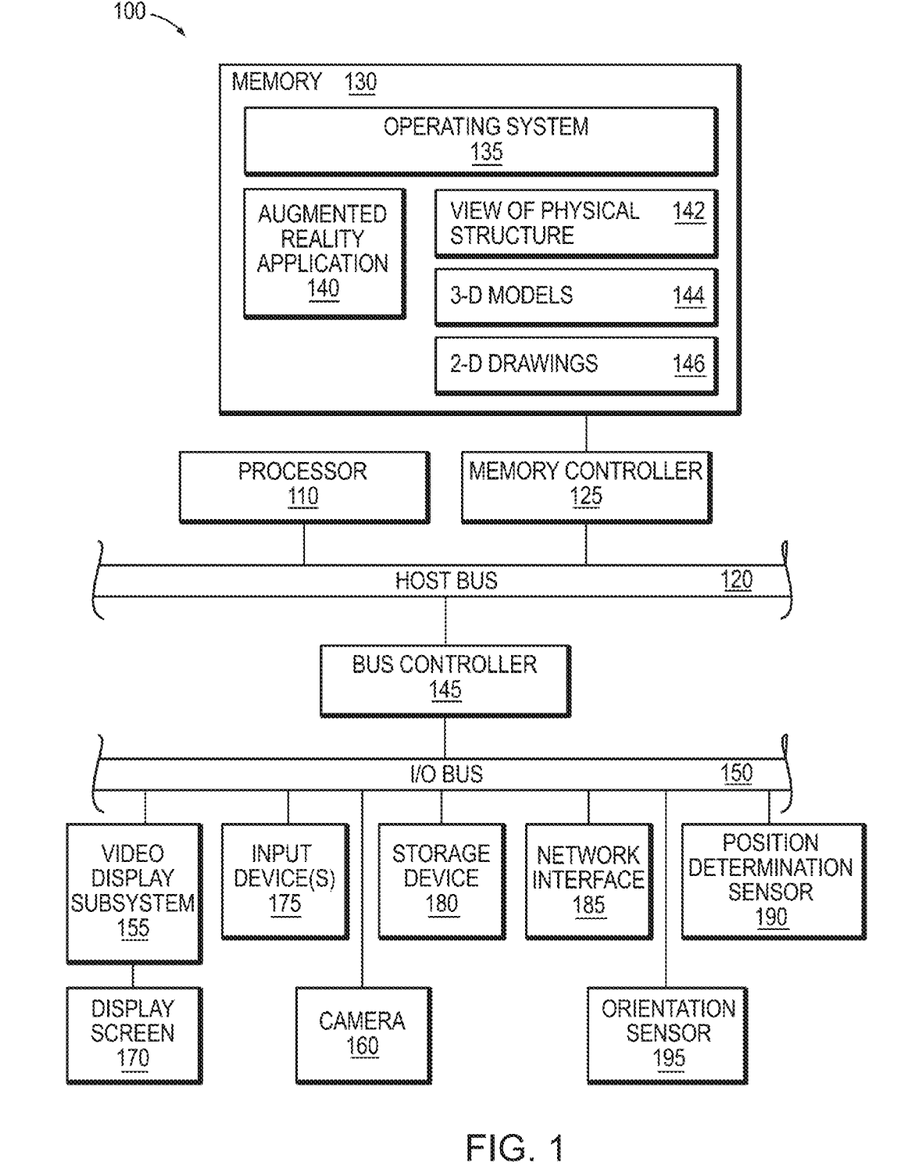
FIG. 1 is a block diagram of an example electronic device, in which at least some of the presently described techniques may be employed.

FIG. 1 is a block diagram of an example electronic device 100, in which at least some of the presently described techniques may be employed. The electronic device may be a portable electronic device, for example, a tablet computer, an ultra-mobile personal computer (UMPC), a smartphone, or another type of mobile computing device that may be readily transported by a user about the physical environment. The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM), is coupled to the host bus 120 via a memory controller 125. The memory 130 is configured to store at least a portion of computer-executable instructions and data for an operating system 135 while the electronic device 100 is operating. In addition, the memory 130 may store at least portions of an augmented reality application 140, which is adapted to overlay computer-generated features upon a view a physical structure in the physical environment. The view of the physical structure, at least temporarily, may be stored in the memory in a data structure 142. The view of the physical structure may be static (e.g., a still image), or dynamic (e.g., video), and may take the form of a panorama captured from the physical environment. The computer generated features may include portions of one or more three-dimensional (3-D) models that correspond to the physical structure, as well as one or more two-dimensional (2-D) drawings of portions of the physical structure. The 3-D models may be vector based models, point clouds, combinations thereof, or other types of environments that describe the layout of 3-D space. The 2-D drawings may be plans, cross sections, or other types of representations that act as directive statements. The 3-D models, at least temporarily, may be stored in the memory 130 in one or more data structures 144, while the 2-D drawings, at least temporarily, may be stored in the memory 130 in one or more additional data structures 146.

The host bus 120 of the electronic device 100 may be coupled to an input/output (I/O) bus 150 through a bus controller 145. A persistent storage device 180, such as a hard disk drive, a solid-state drive, or another type or persistent data store, is coupled to the I/O bus 150, and may persistently store computer-executable instructions and data, that are available to be loaded into the volatile memory 130 when needed. The computer-executable instructions may include instructions for the augmented reality application 140, while the data may include the data structures 144 for the one or more 3-D models and the data structures 146 for the one or more 2-D drawings.

A camera 160 (e.g., a video camera or a still camera) may be coupled to the I/O bus 150 and configured capture a view (e.g., a static view or a dynamic view) of the physical environment including the physical structure. The view captured by the camera may be used as the view which is subject to augmentation to produce an augmented reality view. Alternatively, the view captured by the camera may be used for other purposes, and the view that is subject to augmentation may be obtained from another source, for example, may be a pre-stored view.

A video display subsystem 155 that includes a display screen 170 may also be coupled to the I/O bus 150. A user interface of the augmented reality application 140 may be shown on the display screen 170. Within this user interface, the augmented reality view of the physical structure may be shown. One or more input devices 175, such as a touch sensor incorporated into the display screen 170, a touchpad, a keyboard, a mouse, a trackball, etc. may be provided and used for interacting with the augmented reality application 140 and other software executing on the electronic device 100. These input devices 175 may be used to active interface elements (e.g., buttons, sliders, controls, etc.) shown in the user interface, or may constitute interface elements in and of themselves.

Further, the I/O bus 150 may be coupled to a network interface 185 (e.g., a wireless interface or a wired interface) that interfaces with a computer network (not shown). The computer network may allow communication between the electronic device 100 and other devices, using any of a number of well known networking protocols. Such communication may enable a variety of collaborative, distributed, and/or remote computing configurations. In some implementations, the I/O bus 150 may be coupled to a position determination sensor 190, for example, a global positioning system (GPS) receiver. The position determination sensor 190 may return an estimate of the position for the electronic device 100 (and by implication the camera 160). Further, in some implementations, the I/O bus 150 may be coupled to an orientation sensor 195 that may return an estimate of the orientation for the electronic device 100 (and by implication the camera 160). Data from position determination sensor 190 and orientation sensor 195, as well as other information, may be used in aligning the 3-D model and the 2-D drawings with the view of the physical structure in the physical environment. Further details of technique that may be utilized is provided in U.S. patent application Ser. No. 13/364, 846 filed on Feb. 2, 2012 by Stéphane Côté et al., for a "Technique for Providing an Initial Pose for a 3-D Model", which is incorporated by reference herein in its entirety.

In one embodiment, the augmented reality application 140 generates an augmented reality view in which a 3-D model is used as an environment for displaying 2-D drawings in connection with a view of a physical structure captured by a camera. By interjecting the 3-D model, the 2-D drawings may be presented in a more understandable manner to the user.

The augmented reality application 140 may impose the 3-D model into the view of the physical structure. The 3-D model corresponds to at least a portion of the physical structure, with elements of the 3-D model corresponding to features of the physical structure and aligned therewith. The elements may be positioned, scaled, and shown with appropriate perspective, so that they are imposed where corresponding features are, or should be, in the physical structure. In one implementation, the bounds of the 3-D model may coincide with exterior surfaces of the physical structure, such that the 3-D model is substantially contained within the physical structure.

A 2-D drawing may also be imposed within the view of the physical structure when creating the augmented reality view. The 3-D model may be used to align the 2-D drawing with respect to the view of the physical structure, such that details shown in the 2-D drawing are aligned with corresponding elements of the 3-D model and corresponding features of the physical structure. One technique that may be used to align the details shown in the 2-D drawing with corresponding elements of the 3-D model is provided in U.S. patent application Ser. No. 12/652,411 filed on Jan. 5, 2010 by Rob Snyder et al., for a "Multi-Dimensional Artifact Assemblage for Infrastructure and Other Assets with Interface Node Mediators", the contents of which are incorporated by reference herein.

The 2-D drawing may be depicted as a planar representation having a particular position and orientation within the augmented reality view. The planar representation may be positioned, scaled, and shown with appropriate perspective, so that it is imposed where corresponding features are, or should be, in the physical structure. In one implementation, the 2-D drawing may be a cross section, and the corresponding elements and features are largely internal to the physical structure. The 2-D drawing may be clipped, such that only a part of it is visible in the augmented reality view of the physical structure.

To permit the user to view the potentially hidden portions of the 2-D drawing, one or both of two mechanisms may be employed. First, the 2-D drawing may be slidable in the augmented reality view, such that it can be slid in, or slid out of, the view of the physical structure. In such an implementation, the 3-D model may not be visible and the view of the physical structure may be fully shown (i.e., not cut away). The 2-D drawing may be clipped where it intersects elements of the 3-D model that coincide with the boundaries of the physical structure. In response to user input, the augmented reality application 140 may move the 2-D drawing in one or more directions along a plane, while orientation is maintained constant. As the 2-D drawing is slide into, or slide out of, the view of the physical structure, the extent to which the 2-D drawing is clipped will change. When fully slid out, the 2-D drawing may be entirely visible, permitting the user to view details that correspond to internal portions of the physical structure.

Second, the 2-D drawing may be shown still aligned with corresponding elements of the 3-D model, using the 3-D model to provide context for the details of the 2-D drawing. The augmented reality application 140 may cause the 3-D model to be visible in the foreground. The 3-D model may be cut away once to provide visual access to the visual access the 2-D drawing. The 3-D model may be further cut away to reveal some portion of the view of the physical structure, to provide contextual background. As a result, the 2-D drawing is shown surrounded by the 3-D model in a selected region, which is in turn shown surrounded by the view of the physical structure. By showing the 2-D drawing within the context of the 3-D model, which is in turn shown within the context of the view of the physical structure, internal details may appear within an understandable setting in the augmented reality view.

Figure 2:
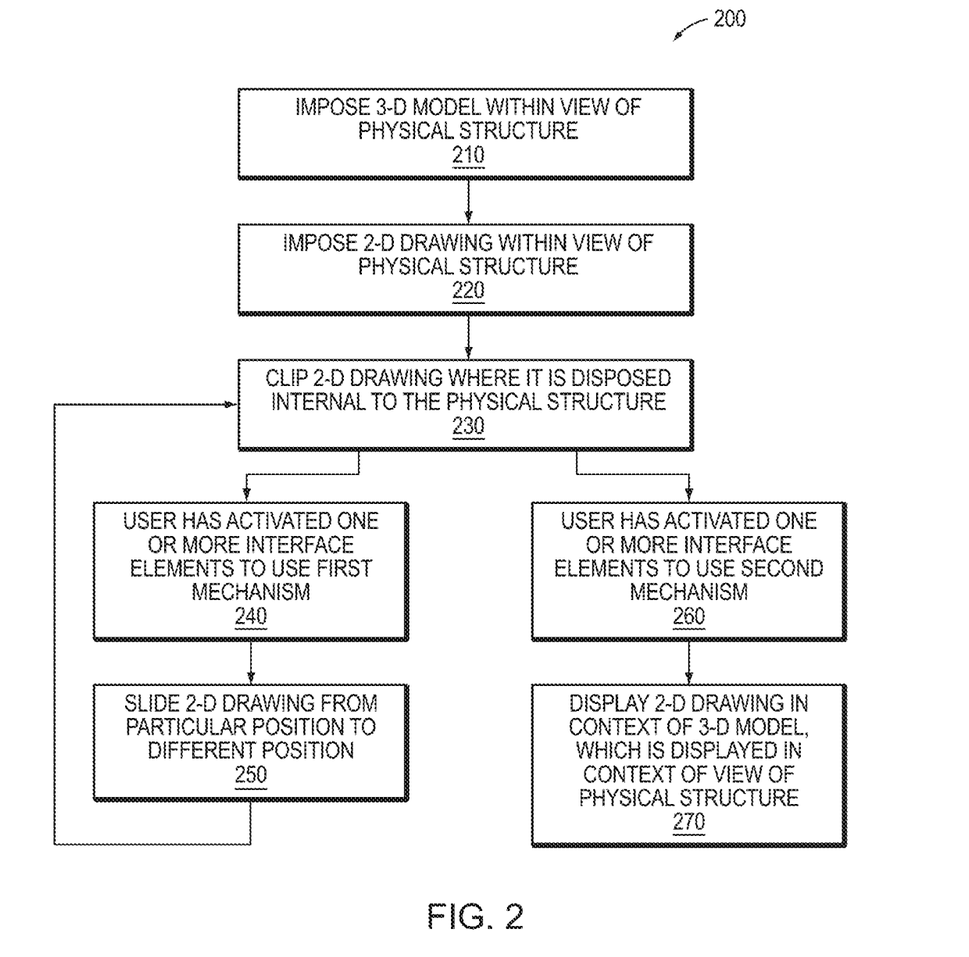
FIG. 2 is a flow diagram of an example sequence of steps for showing a 2-D drawing in an augmented reality view of a physical structure in the physical environment by interjecting a 3-D model.

FIG. 2 is a flow diagram of an example sequence of steps 200 for showing a 2-D drawing in an augmented reality view of a physical structure in the physical environment by interjecting a 3-D model into the view. At step 210, the augmented reality application 140 imposes the 3-D model within the view of the physical structure. Such operation may involve aligning the 3-D model with the view of the physical structure. As part of the aligning, the operation may scale elements of the 3-D model to coincide with the size of features in the view of the physical structure. Alternatively, the operation may scale the view of the physical structure to coincide with the size of elements of the 3-D model. While the 3-D model is aligned with the view of the physical structure, some or all of the model may not be visible to the user. At step 220, the augmented reality application 140 may use the 3-D model as an environment for imposing a 2-D drawing within the view of the physical structure. Such operation may utilize the 3-D model to align the 2-D drawing with respect to the view of the physical structure, such that the 2-D drawing is shown at a particular position and orientation. This may utilize techniques described in U.S. patent application Ser. No. 12/652,411 filed on Jun. 5, 2011 by Rob Snyder et al., for a "Multi-Dimensional Artifact Assemblage for Infrastructure and Other Assets with Interface Node Mediators", which was incorporated above. Further, the 2-D drawing may be scaled and shown with proper perspective.

At step 230, the augmented reality application 140 may clip the 2-D drawing where it is disposed internal to the physical structure. This may be performed by clipping the drawing where it intersects elements of the 3-D model. In some cases, much of the 2-D drawing may be clipped.

Figure 3:
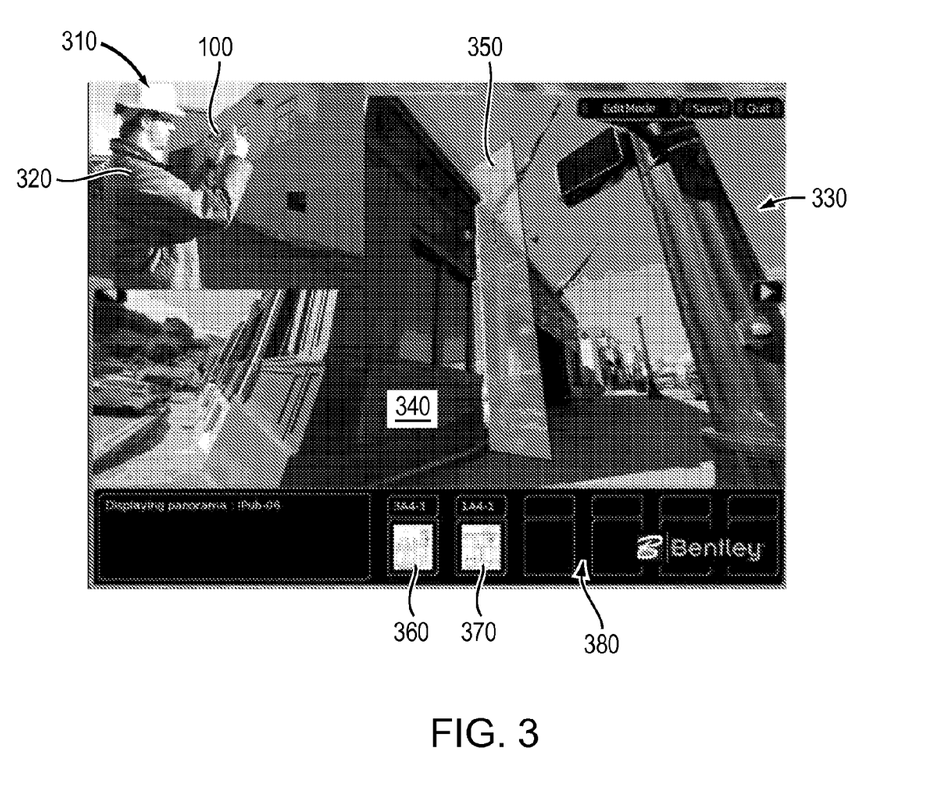
FIG. 3 is a multi-part illustration showing an example 2-D drawing positioned such that its details are aligned with corresponding elements in a 3-D model (not visible) and features of a physical structure.

FIG. 3 is a multi-part illustration showing an example 2-D drawing 350, in this example positioned such that its details are aligned with corresponding elements in a 3-D model (not visible) and features of a physical structure. In this example, the 2-D drawing represents a cross section, and the physical structure is a building. A first part 310 of the multi-part illustration depicts a user 320 holding the electronic device 100, such that its camera 160 captures a view of the physical environment including a view of a physical structure 340. This part of the multi-part illustration illustrates activity in the physical world. A second part 330 of the multi-part illustration depicts a user interface of the augmented reality application 140 that may be shown on the display screen 170 of the electronic device 100.

The majority of the user interface may be devoted to an augmented reality view based upon the view of the physical structure 340. In the augmented reality view, the 2-D drawing 350 is depicted as a planar representation in a particular position, scaled and with perspective, such that its details are imposed upon corresponding elements in the 3-D model (not visible) and features of the physical structure 340. The 2-D drawing 350 may be depicted with at least some transparency, such that features in the view of the physical structure 340 (and in some cases the 3-D model) are at least partially visible through the 2-D drawing. The transparency may be colored transparency. Further, the details shown in the 2-D drawing 350 may be depicted in a high contrast color (e.g., white) to enhance their visibility.

An additional portion of the user interface may be devoted to a selection menu 380 of 2-D drawings. By selecting among icons 360, 370 in the selection menu 380, a user may select a different 2-D drawing to be shown in the augmented reality view.

Returning to FIG. 2, to permit the user to view hidden portions of the 2-D drawing, two mechanisms may be employed. Depending on the particular implementation, the augmented reality application 140 may offer one of the two mechanisms, or both of the two mechanisms. At step 240, a user may activate one or more interface elements in the user interface to utilize the first mechanism.

At step 250, according to the first mechanism, the 2-D drawing may be slid from its particular position in the augmented reality view to a different position. Step 250 may operate in conjunction with step 230 (represented by the return arrow in FIG. 2), such that the portions of the 2-D drawing that are clipped are updated as the drawing is slid. The 2-D drawing may be slid to a different position such that it appears to move out of the physical structure. Similarly, the 2-D drawing may be later slid back to its particular position, such that it appears to move back into the physical structure.

Figure 4:
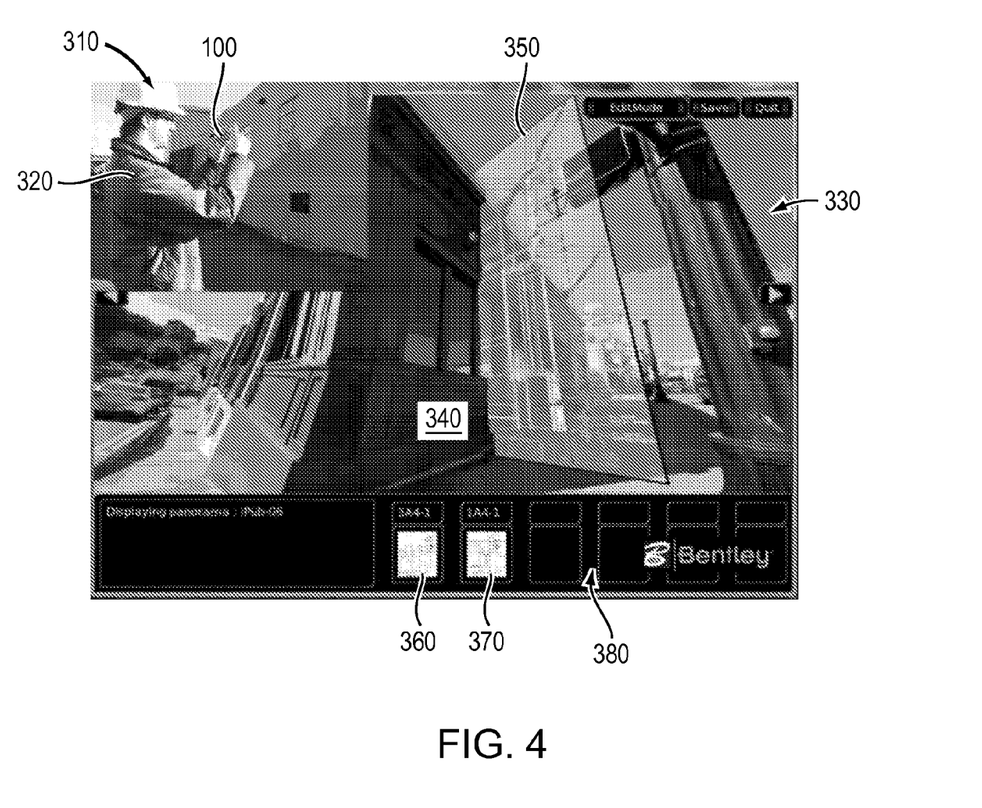
FIG. 4 is a multi-part illustration based on FIG. 3, showing the example 2-D drawing of FIG. 3 in a slid out position.

FIG. 4 is a multi-part illustration based on FIG. 3, showing the example 2-D drawing 350 of FIG. 3 in a slid out position. As can be seen in FIG. 4, less of the 2-D drawing 350 is now clipped, rendering its details visible. However, these details are no longer aligned with the corresponding features in the view of the physical structure 340. The user may chose to alternate between the slid in positioning of FIG. 3, and the slid out positioning of FIG. 4, in order to appreciate the details of the 2-D drawing 350, while understanding how they are aligned with the features of the physical structure 340.

Returning to FIG. 2, at step 260, a user may activate one or more interface elements in the user interface to utilize the second mechanism.

Figure 5:
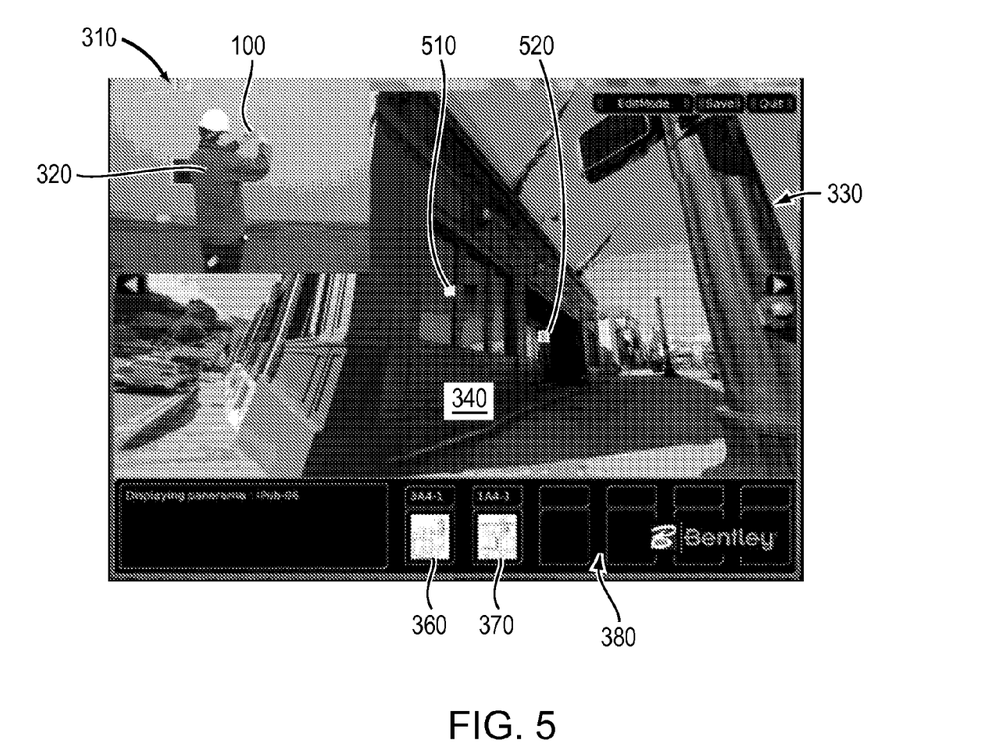
FIG. 5 is a multi-part illustration based on FIGS. 3-4, showing a button for displaying the example 2-D drawing using another mechanism.

FIG. 5 is a multi-part illustration based on FIGS. 3-4, showing a button 510 for displaying the 2-D drawing 350 using the second mechanism. An additional button 520 is provided for displaying an additional 2-D drawing in similar manner. The buttons 510, 520 may operate similar to the icons 360, 370 in the selection menu 380.

Figure 6:
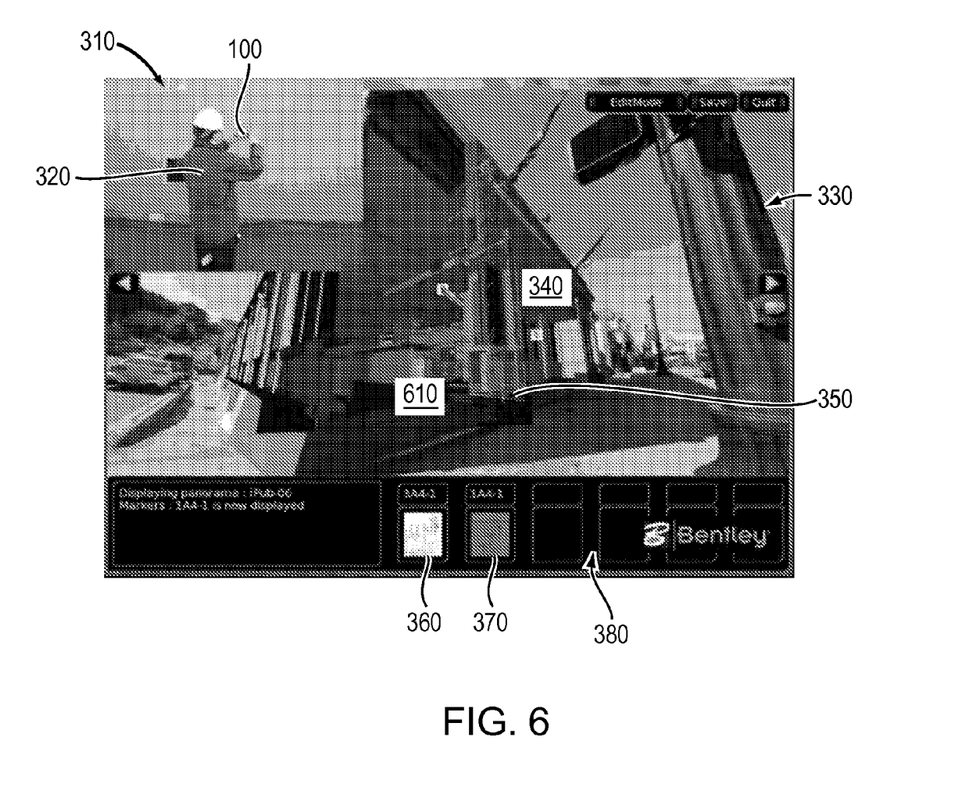
FIG. 6 is a multi-part illustration based on FIGS. 3-5, showing the example 2-D drawing in the context of the 3-D model, which is in turn shown in the context of a view of the physical structure.

Returning to FIG. 2, at step 270, the 2-D drawing is displayed at the particular position (i.e. in-situ) by displaying it in the context of the 3-D model, which is in turn displayed in the context of the view of the physical structure. FIG. 6 is a multi-part illustration based on FIGS. 3-5, showing the example 2-D drawing 350 in the context of a 3-D model 610, which is shown in the context of the view of the physical structure 340. The 3-D model 610 is visible in the foreground. The 3-D model may be cut away once to provide visual access to the visual access the 2-D drawing 350. The 3-D model may be further cut away to reveal some portion of the view of the physical structure 340, such that the 3-D model left shown only in a selected region. The 3-D model 610 provides an environment in which the internal details depicted in the 2-D drawing 350 are understandable to the user.

Figure 7:
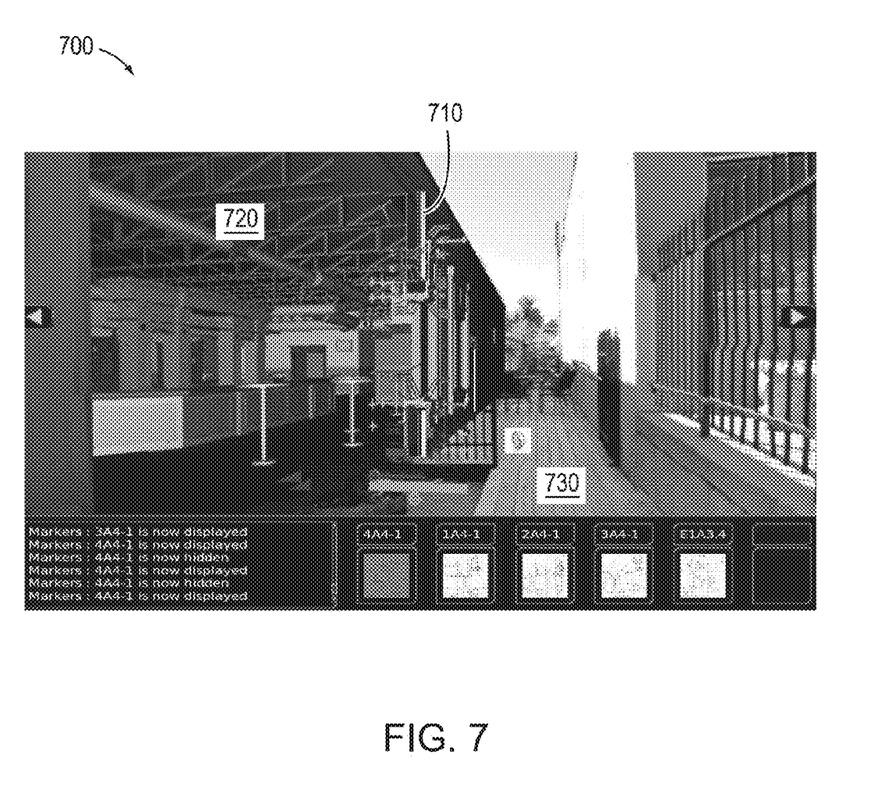
FIG. 7 is an enlarged illustration, showing another example 2-D drawing in the context of a 3-D model, which is shown in the context of a view of another physical structure.

FIG. 7 is an enlarged illustration 700, showing another example 2-D drawing 710 in the context of a 3-D model 720, which is shown in the context of a view of another physical structure 730. Here a greater portion of the exterior of the physical structure is cut away than in FIG. 6.

Figure 8:
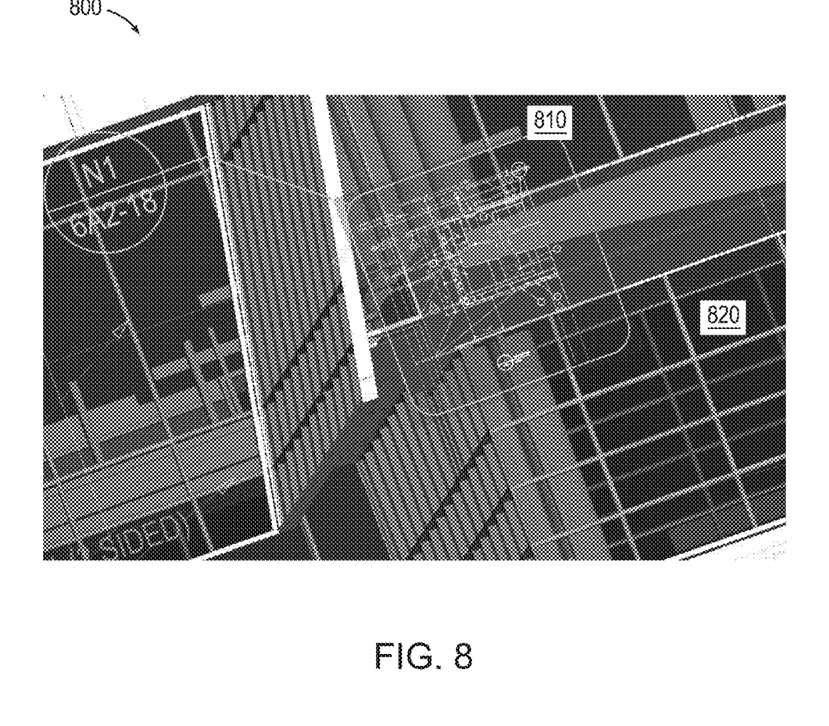
FIG. 8 is an alternate illustration showing a 2-D drawing imposed with on a 3-D model.

As discussed above, the 2-D drawing may be depicted with at least some transparency, and with details shown in a high contrast color. FIG. 8 is an alternate illustration showing a 2-D drawing 810 imposed with colored transparency and high contrast details on a 3-D model 820, such that elements of the 3-D model are visible through the 2-D drawing.

While the above description discusses various embodiments of the present disclosure, it should be apparent that a number of modifications and/or additions may be made without departing from the disclosure's intended spirit and scope.

While it is discussed above that data structures 142-146 storing the view of the physical structure, the 3-D model and one or more 2-D drawings, may all be resident on the electronic device 100, and the augmented reality view composed on the electronic device 100, in alternative embodiments, these data structures may be distributed among two or more electronic devices, and/or two or more electronic devices may perform various ones of the operations used to compose the augmented reality view. For example, a remote workstation or server may work in conjunction with the electronic device 100. In some cases, a majority the data may be stored at, and a majority of the operations performed at the remote workstation/server, and the electronic device 100 simply used to display received transmissions.

Further, while a building is discussed above as an example of a physical structure, it should be understood that a physical structure may take any of a variety of other forms. For example, a physical structure may be a civil engineering work such as a bridge or dam, a mechanical apparatus such as vehicle or piece of machinery, or another real-world object constructed from one or more parts.

Furthermore, it should be understood that the above described techniques may be implemented in software, in hardware, or a combination thereof. A software implementation may include executable instructions that implement applications stored in a non-transitory computer-readable medium, such as a volatile or persistent memory device, a hard-disk, a compact disk (CD), etc. A hardware implementation may include processors, memory chips, programmable logic circuits, application specific integrated circuits, and/or other types of hardware components. Further, a combined software/hardware implementation may include both computer-executable instructions stored in a non-transitory computer-readable medium, as well as one or more hardware components. Accordingly, it should be understood that the above descriptions are meant to be taken only by way of example.

What is claimed is:

1. A method for displaying a two-dimensional (2-D) drawing that includes details corresponding to internal features of a physical structure in an augmented reality view shown on a display screen of an electronic device, comprising:

imposing a three-dimensional (3-D) model that includes internal features of the physical structure within a view of the physical structure captured by a camera;

imposing the 2-D drawing that includes the details corresponding to the internal features of the physical structure within the view of the physical structure captured by the camera;

determining, by the electronic device, an interface element in a user interface has been activated by a user; and in response to activation of the interface element, showing a portion of the 2-D drawing that includes the details corresponding to the internal features of the physical structure by displaying the portion of the 2-D drawing surrounded by a portion of the 3-D model that includes the internal features to provide context for the details, and displaying the portion of the 3-D model surrounded by a portion of the view of the physical structure captured by the camera that provides context for the internal features.

2. The method of claim 1, wherein the imposing the 3-D model comprises:
aligning the 3-D model with the view of the physical structure.

3. The method of claim 1, wherein the 2-D drawing is depicted as a planar representation and the imposing the 2-D drawing comprises:
aligning the 2-D drawing to have a particular position and orientation with respect to the view of the physical structure.

4. The method of claim 1, further comprising:
prior to the determining, clipping a portion of the 2-D drawing disposed internal to the physical structure so that the details of the 2-D drawing that correspond to the internal features are hidden.

5. The method of claim 1, wherein the 3-D model includes a vector-based model or a point cloud.

6. The method of claim 1, wherein the 2-D drawing includes a plan view or a cross section.

7. The method of claim 1, wherein the physical structure is a building and the view of the physical structure is a still image of the building, the 3-D model is a vector model or point cloud that includes elements corresponding to internal features of the building, and the 2-D drawing is a plan view or cross section that includes details corresponding to the internal features of the building.

8. The method of claim 1, wherein the view of the physical structure captured by the camera is a view of the exterior of the physical structure, such that the portion of the 2-D drawing that includes the details corresponding to the internal features of the physical structure is surrounded by the portion of the 3-D model that includes the internal features, and the portion of the 3-D model is surrounded by the portion of the view of the exterior of the physical structure captured by the camera.

9. A method for displaying a two-dimensional (2-D) drawing in an augmented reality view shown on a display screen of an electronic device, comprising:
imposing a three-dimensional (3-D) model within a view of a physical structure captured by a camera;
imposing the 2-D drawing within the view of the physical structure;
clipping a portion of the 2-D drawing disposed internal to the physical structure;
determining, by the electronic device, an interface element in a user interface has been activated by a user; and
in response to activation of the interface element, showing the portion of the 2-D drawing whose details correspond to internal features of the physical structure by sliding the 2-D drawing from a particular position with respect to the view of the physical structure to a different position with respect to the view of the physical structure, and updating the clipping based on the different position of the 2-D drawing.

10. The method of claim 9, wherein the sliding moves the 2-D drawing along a plane while orientation is maintained constant.

11. The method of claim 9, wherein the imposing the 3-D model comprises:
aligning the 3-D model with the view of the physical structure.

12. The method of claim 9, wherein the 2-D drawing is depicted as a planar representation and the imposing the 2-D drawing comprises:
aligning the 2-D drawing to have a particular position and orientation with respect to the view of the physical structure.

13. The method of claim 9, wherein the particular position is a slid in position, and the different position is a slid out position.

14. The method of claim 9, further comprising:
determining, by the electronic device, a second interface element in a user interface has been activated by a user; and
in response to activation of the second interface element, showing the portion of the 2-D drawing whose details correspond to internal features of the physical structure by displaying the 2-D drawing within context of the 3-D model and displaying the 3-D model within context of the view of the physical structure.

15. The method of claim 9, wherein the showing comprises:
showing the 3-D model within a selected region of the view of the physical structure; and
displaying the 2-D drawing surrounded, at least in part, by the 3-D model, which is in turn shown surrounded by the view of the physical structure.

16. An electronic device for displaying a two-dimensional (2-D) drawing that includes details corresponding to internal features of a physical structure in an augmented reality view, comprising:
a display screen configured to show the augmented reality view based on a view of the physical structure captured by a camera;
a processor; and
a memory coupled to the processor and configured to store instructions for an application that is executable on the processor, the instructions for the application, when executed, operable to:
impose a three-dimensional (3-D) model that includes internal features of the physical structure within the view of the physical structure,
impose the 2-D drawing that includes the details corresponding to the internal features of the physical structure within the view of the physical structure captured by the camera, and
show a portion of the 2-D drawing that includes the details corresponding to the internal features of the physical structure by a display of the portion of the 2-D drawing surrounded by a portion of the 3-D model that includes the internal features to provide context for the details and a display of the portion of the 3-D model surrounded by a portion of the view of the physical structure captured by the camera that provides context for the internal features.

17. An electronic device for displaying a two-dimensional (2-D) drawing in an augmented reality view, comprising:
a display screen configured to show the augmented reality view based on a view of a physical structure captured by a camera;
a processor; and
a memory coupled to the processor and configured to store instructions for an application that is executable on the processor, the instructions for the application, when executed, operable to:
impose a three-dimensional (3-D) model within the view of the physical structure, impose the 2-D drawing within the view of the physical structure, clip the portion of the 2-D drawing disposed internal to the physical structure, and show the portion of the 2-D drawing whose details correspond to internal features of the physical structure by sliding the 2-D drawing from a particular position with respect to the view of the physical structure to a different position with respect to the view of the physical structure, and updating the clipping based on the different position of the 2-D drawing.

18. The electronic device of claim 17, wherein the instructions that, when executed, are operable to impose the 3-D model are further operable to:

align the 3-D model with the view of the physical structure.

19. The electronic device of claim 17, wherein the 2-D drawing is depicted as a planar representation and wherein the instructions that, when executed, are operable to impose the 2-D drawing are further operable to:

align the 2-D drawing to have a particular position and orientation with respect to the view of the physical structure.

20. The electronic device of claim 17, wherein the instructions, when executed, are further operable to:

initially clip a portion of the 2-D drawing disposed internal to the physical structure so that the details of the 2-D drawing corresponding to the internal features are hidden.

21. The electronic device of claim 17, wherein the 3-D model includes a vector-based model or a point cloud.

22. The electronic device of claim 17, wherein the 2-D drawing includes a plan view or a cross section.

23. The electronic device of claim 17, wherein the physical structure is a building and the view of the physical structure is a still image of the building, the 3-D model is a vector model or point cloud that includes elements corresponding to internal features of the building, and the 2-D drawing is a plan view or cross section that includes details corresponding to the internal features of the building.

24. A method for displaying a two-dimensional (2-D) drawing that includes details of a physical structure in an augmented reality view shown on a display screen of an electronic device, comprising:

displaying a view of physical structure captured by a camera as part of an augmented reality view on the display screen of the electronic device;

aligning the 2-D drawing within the augmented reality view to have a particular position and orientation;

determining that when the 2-D drawing is aligned within the augmented reality view there would not be a surface in the view of the physical structure coinciding with the position and orientation of the 2-D drawing on which to display the details of the 2-D drawing; and providing an environment in which to display the details of the 2-D drawing by showing a portion of a 3-D model of the physical structure in a region about the 2-D drawing in the augmented reality view, to create a display in which the 2-D is drawing is shown surrounded by the portion of the 3-D model of the physical structure, and the portion of the 3-D model is shown surrounded by at least part of the view of the physical structure captured by the camera.

25. The method of claim 24 in which the view of the physical structure captured by the camera is a view of the exterior of the physical structure, the 2-D drawing includes details corresponding to internal features of the physical structure not visible in the view of the exterior of the physical structure, and the 3-D model includes the internal features of the physical structure.

\* \* \* \* \*

UNITED STATES PATENT AND TRADEMARK OFFICE
CERTIFICATE OF CORRECTION

PATENT NO. : 9,460,561 B1
APPLICATION NO. : 13/836776
DATED : October 4, 2016
INVENTOR(S) : Stéphane Côté et al.

Page 1 of 1

It is certified that error appears in the above-identified patent and that said Letters Patent is hereby corrected as shown below:

In the Claims
Claim 24, Column 12, Line 24 reads:
display in which the 2-D is drawing is shown sur-
Should read:
display in which the 2-D drawing is shown sur- Signed and Sealed this
Second Day of October, 2018

Andrei Iancu
*Director of the United States Patent and Trademark Office*